(12) United States Patent
Pelletier et al.

(10) Patent No.: US 7,720,825 B2
(45) Date of Patent: May 18, 2010

(54) SYSTEM AND METHOD FOR ENABLING RECORDS MANAGEMENT

(75) Inventors: Michael C. Pelletier, Coral Springs, FL (US); Joseph C. Polimeni, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 11/255,811

(22) Filed: Oct. 21, 2005

(65) Prior Publication Data

US 2007/0094311 A1   Apr. 26, 2007

(51) Int. Cl.
*G06F 7/00* (2006.01)
*G06F 17/30* (2006.01)

(52) U.S. Cl. .................... 707/694; 705/50; 705/51; 705/54

(58) Field of Classification Search ............ 705/50, 705/51, 54; 707/9, 206
See application file for complete search history.

(56) References Cited

U.S. PATENT DOCUMENTS

| | | | |
|---|---|---|---|
| 5,107,419 A | 4/1992 | MacPhail | |
| 5,132,900 A | 7/1992 | Gilchrist et al. | |
| 6,418,421 B1 * | 7/2002 | Hurtado et al. | 705/54 |
| 6,820,063 B1 * | 11/2004 | England et al. | 705/54 |
| 7,017,188 B1 * | 3/2006 | Schmeidler et al. | 726/26 |
| 7,080,043 B2 * | 7/2006 | Chase et al. | 705/59 |
| 2003/0126215 A1 | 7/2003 | Udell et al. | |
| 2003/0236788 A1 | 12/2003 | Kanellos et al. | |
| 2005/0055518 A1 | 3/2005 | Hochberg et al. | |
| 2005/0055519 A1 | 3/2005 | Stuart et al. | |
| 2005/0076042 A1 | 4/2005 | Stakutis et al. | |
| 2005/0076066 A1 | 4/2005 | Stakutis et al. | |

FOREIGN PATENT DOCUMENTS

| | | |
|---|---|---|
| EP | 0 322 130 | 6/1989 |
| GB | 2 350 711 | 12/2000 |
| WO | WO 98/58321 | 12/1998 |

OTHER PUBLICATIONS

PCT/EP2006/067048, Oct. 2006, IBM Corporation.
Authentica, Inc., "Enterprise Rights Management for Document Protection", XP002412799, pp. 1-16, Oct. 1, 2005, Lexington, MA.
Cohasset Associates, Inc., "Compliance Requirements Assessment, IBM DB2 Records Manager and Record-Enabled Solutions", pp. 1-54, Oct. 31, 2004, Chicago, IL.

* cited by examiner

*Primary Examiner*—Greta L Robinson
*Assistant Examiner*—Jeffrey Chang
(74) *Attorney, Agent, or Firm*—Jon A. Gibbons; Fleit Gibbons Gutman Bongini & Bianco P.L (57) ABSTRACT

A system, method, and computer program product for managing a retention period for electronic content data are disclosed. The method includes running a records manager system. The records manager system defines a retention period for a plurality of electronic content data. The records manager system instructs a digital rights manager system to protect each of the plurality of electronic content data. Each of the plurality of electronic content data are protected with at least one usage policy for at least one of the plurality of electronic content data related to the retention period as governed by the records manager system. The defined retention period is logged, for later auditing, for each of the plurality of the electronic content data.

18 Claims, 6 Drawing Sheets

SYSTEM AND METHOD FOR ENABLING RECORDS MANAGEMENT

FIELD OF THE INVENTION

The present invention generally relates to the field of managing electronic content data through content manager systems, records management systems, and digital rights management systems, and more particularly relates to extending retention policies governed by a records management system to electronic content data residing on a local computer.

BACKGROUND OF THE INVENTION

Managing and retaining electronic content data has become increasingly important for business especially in light of the Sarbanes-Oxley Act. One type of system that allows business to manage and retain their electronic content data is a content management system. Content management systems organize and facilitate the collaborative creation of documents and other content. Electronic content data can be created, secured, retained, destroyed, and monitored when using content management systems. Content management systems include a database for retaining the electronic content data managed by the system. Also, a records manager system is usually included within a content management system.

The conventional records manager system consists of a database having entries each associated with a respective electronic record. Typically, each entry includes fields which identify the title, author, publication date, subject matter, status, and location of the associated record. In addition, each entry may also include a record retention data field which identifies the time period after which the record should be archived to storage, and the time period after which the archived record should be destroyed.

Typically, record management systems have been used to manage libraries of paper or otherwise tangible documents. However, given the proliferation of electronic documents, such as word processing documents, spreadsheet documents, drawing documents and e-mail, attempts have been made to provide software solutions for managing electronic records, including their retention and disposal.

In addition to using content management and records manager systems to manage and organize electronic data, digital rights management systems offer businesses control on how electronic content data is used. These systems, referred to as Digital Rights Management (DRM) Systems, are able to restrict access to data sets by limiting authorization to one or more types of usages of a data set in response to specified usage conditions. Access control in these systems is controlled through specified Digital Property Rights (DPRs). An example of a DPR is a right to only read a particular media data set for a specified number of times. Such a DPR may be used to provide a free or low cost demonstration of the multimedia data set. Existing systems support a variety of conditions on usage of the media data set and those conditions may be specified on a remote license server, but the available types of usages that may be authorized are fixed by the implementation and may not be flexibly varied by the owners of the copyright on a media data set.

Even though the above described systems are useful, they are not without their short comings, drawbacks, and deficiencies. One problem with the prior art is that electronic content data downloaded onto a user's desktop is no longer managed by the record manager system. Even though the digital rights management system controls how the electronic data is used, it does not abide by the retention policies of the records management system. For example, a records manager sets a retention policy for an email at two years and at the end of the two years the email is to be deleted. The author of the email can set digital rights usage policy so that the email can be used indefinitely. Once a copy of the email is downloaded onto a user's computer, the two year retention policy no longer is applicable to the copy. The copy still exits even though email has been deleted from the records management system.

Therefore a need exists to overcome the problems with the prior art as discussed above.

SUMMARY OF THE INVENTION

Briefly, in accordance with an embodiment of the present invention, disclosed are a system, method, and computer program product on an information processing system for managing a retention period for electronic content data. The method includes running a records manager system. The records manager system defines a retention period for a plurality of electronic content data. The records manager system instructs a digital rights manager system to protect each of the plurality of electronic content data. Each of the plurality of electronic content data are protected with at least one usage policy for at least one of the plurality of electronic content data related to the retention period as governed by the records manager system. The defined retention period is logged, for later auditing, for each of the plurality of the electronic content data.

In another embodiment of the present invention a system for managing a retention period for electronic content data is disclosed. The system comprises a content manager system for managing a plurality of electronic content data. The system also includes a digital rights management system for associating usage polices with the plurality of electronic content data. A records manager system is also included and is communicatively coupled to the content manager system and the digital rights management system. The records manager system defines a retention period for the plurality of electronic content data. The records manager system also instructs the digital rights manager system to protect each of the plurality of electronic content data with at least one usage related to the retention period as governed by the records manager system.

In yet another embodiment of the present invention a computer program product for managing a retention period for electronic content data is disclosed. The computer program product includes running a records manager system. The records manager system defines a retention period for a plurality of electronic content data. The records manager system instructs a digital rights manager system to protect each of the plurality of electronic content data. Each of the plurality of electronic content data are protected with at least one usage policy for at least one of the plurality of electronic content data related to the retention period as governed by the records manager system. The defined retention period is logged, for later auditing, for each of the plurality of the electronic content data.

An advantage of the foregoing embodiments of the present invention is that electronic content data downloaded to a local computer is able to be managed by a records manager system through a digital management rights system. The records manager system is able to update the usage policies for electronic data set by the digital rights management system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by allowing a records management system to enforce retention polices defined for electronic content data that has been transferred out of a content management system. The present invention allows a records management system to enforce its retention policies through a digital rights management system.

Exemplary System

Figure 1:
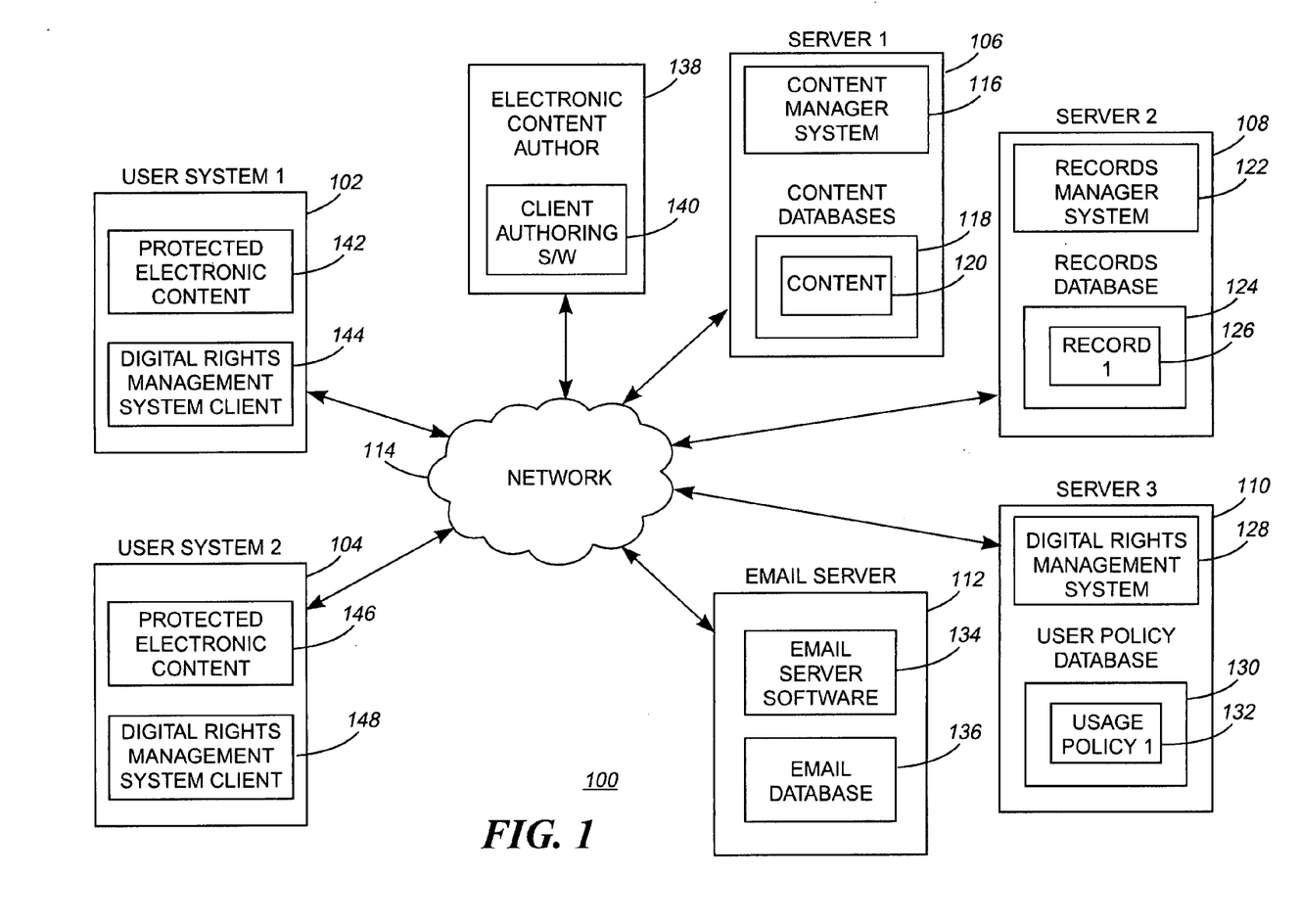
FIG. 1 is block diagram illustrating an exemplary computer network system according to an embodiment of the present invention.
Figure 2:
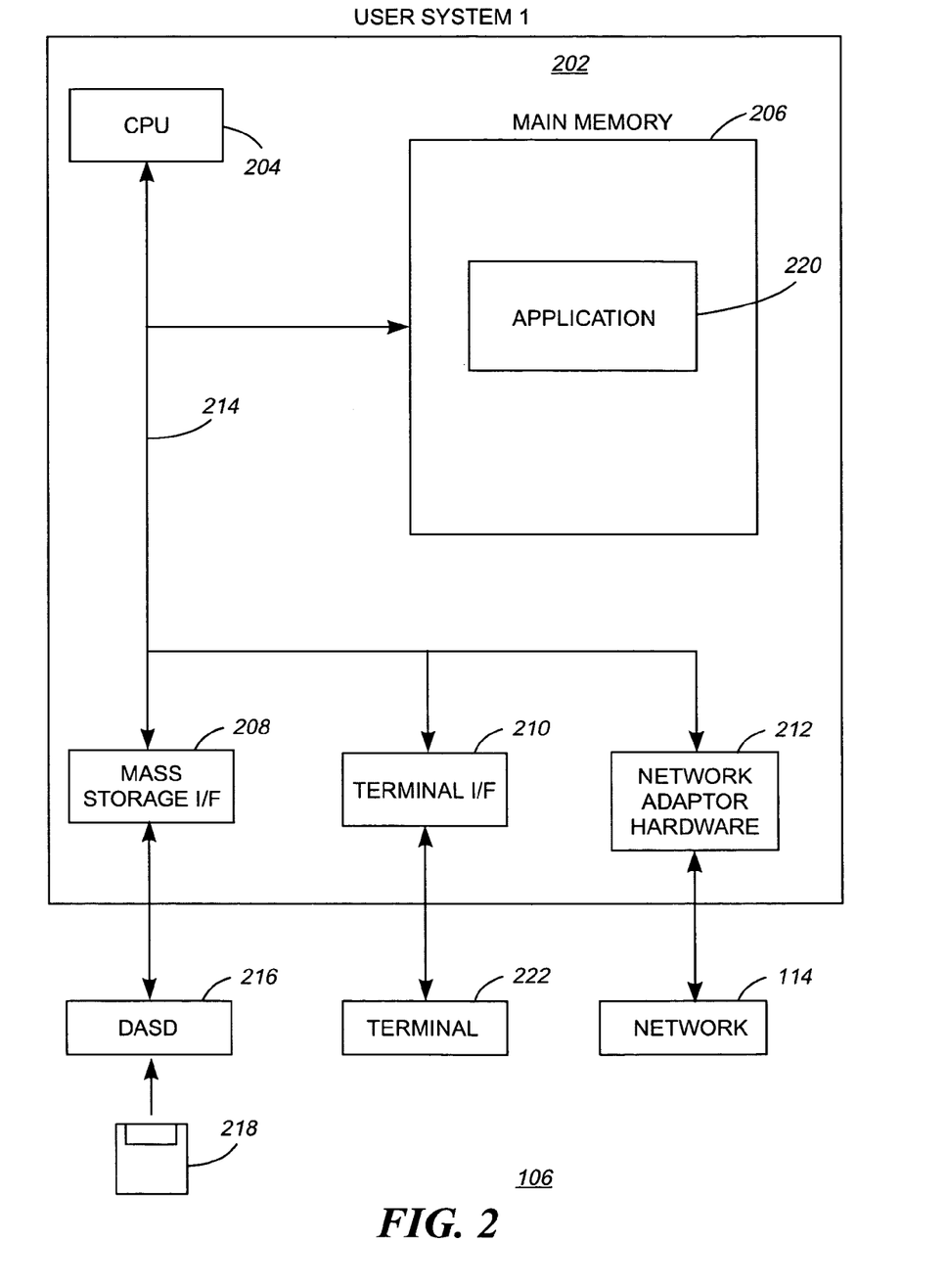
FIG. 2 is a block diagram illustrating an exemplary information processing system according to an embodiment of the present invention.

According to an embodiment of the present invention, as shown in FIG. 1, an exemplary system 100 is illustrated. FIG. 2 shows a system 100 comprising at least user systems 102, 104 and an electronic content author 138. User system1 102, user system2 104, and the electronic content author 138 communicate with at least one server 106, 108, 110, 112 through a network 114. The network 114, according to one embodiment, is a LAN, WAN, World Wide Web, wired, wireless network, or the like.

The server1 106 includes a content manager system 116. A content manager system 116 allows for the organization and managing of the creation and dissemination of electronic content data such as documents, pictures, emails, video, audio, or the like. The content manager system 116 also allows for the creation, capture, storing, and publishing of such electronic content. One example of a content manager system is IBM's Content Manager as described in the white paper entitled "Delivering information on demand with IBM enterprise content management solutions".

The server1 106 also includes a content database 118 for storing content to be managed by the content manager system 116. For example, if an email is to be managed by the content manager system 116, the email is stored in the content database 118 and has an entry 120 in the content database 118. Even though FIG. 1 shows the content database 118 resides outside of the content manager system 116, the content database 118 can reside inside the content manager system 116 or on another server.

The server2 108 includes a records manager system 122 for managing the retention of electronic content data. Records manager systems allow for the identifying, classifying, archiving, and sometimes the controlled destruction of records. A record is electronic content data that has been identified as information that is to be managed by the records manager system 122. Corporate policies, federal laws, and/or state laws can mandate that records such as emails need to be retained for a certain period time. An example of a corporate policy for retaining records is a university's retention policy of keeping financial aid records for three years. An example of a state law retention policy is a state's policy of keeping administrative records for three years. The Sarbanes-Oxley Act is an example of a federal law which includes record management policies.

The record manager system 122 thereby sets a retention policy according to the respective corporate policy, federal law, and/or state law. For example, a retention policy defined by the records manager system 122 can state that certain emails are to be retained for 2 years after which time they are to be deleted. In one embodiment, the records manager system 122 also logs the defined retention period for later auditing. For example, the records manager system 122 or an administrator of the records manager system 122 can monitor this log (not shown) to determine what retention periods existed for specific records.

In another embodiment, the records manager system 122 also logs that access has been restricted to records having an expired retention period. This logged information can be communicated to a digital rights management system 128 for dynamically updating a digital rights management policy associated with a record. One example of a records manager system is IBM's Record Manager, as described in the white paper entitled "Compliance Requirements Assessment: IBM DB2 Records Manager and Record-Enabled Solutions" prepared by Cohasset Associates, Inc., October 2004.

Server2 108 also includes a records database 124 for storing records of electronic content data that is to be managed by the records manager system 122. For example, an email that is to be managed by the records manager system 122 has a record 126 associated with it in the records manager system 124. The email, for example, is stored in the content database 118 of the content manager system 116. The record 126 in the record manager system 126 associated with the email also includes policy information (not shown) that is associated with the email. For example, retention policy information associated with the email might state that the email is to be retained for two years and then deleted from the content database 120. In another embodiment, the record 126 also includes information associated with policy updates that the records manager system 122 transmits to the digital rights management system 128. Even though the records database 124 is shown residing outside of the records manager 122, it can, in one embodiment, reside within the records manager system 122. Also, the records manager system 122, in one embodiment, resides within the content manager system 116.

Server3 110 includes a digital rights management system (DRMS) 128. A digital rights management system 128 is a system for protecting electronic content data circulated via a network by enabling secure distribution. Typically, a digital rights management system protects electronic content data by encrypting the data so that it can only be accessed and used by authorized users according to a digital rights usage policy. For example, a digital rights usage policy can state that only users within a company's intranet may open and view an email sent from management. One example of a DRMS is Authentica's Active Rights Management as described in the white paper entitled "Enterprise Rights Management for Document Protection", Authentica 2005 of Authentica Inc., Lexington Mass. Another example of a DRMS is Microsoft's Rights Management System.

Server3 110 also includes a usage policy database 130 for storing usage policies set by the DRMS and associated with electronic content data. For example, a usage policy stating that only users within an intranet can view, forward, and print an email sent by management is stored in the usage policy database as a usage policy record1 132. Even though the usage policy database 130 is shown in FIG. 1 as residing outside of the DRMS 128, the usage policy database 130 can reside within the DRMS 128.

The email server 112 includes email server software 134 such as Microsoft's Exchange Server 2003 for managing electronic mail. The email server 112 also includes an email database 136 for archiving emails sent through the email server 112 by, for example, an electronic content author 138. The electronic content author 138, for example, uses client authoring software 140 such as Microsoft Outlook to create an email to be managed by the email server 112. The electronic content created by the electronic content author 138 is also managed by the content manager system 116, records manager system 122, and protected by the DRMS 128. Although the electronic content data has been described with reference to email, the electronic content data can also be electronic documents, pictures, video, audio, and the like. Also, the present invention is not limited to including an email server 112 in the system 100. The email server 112 is included in the system 100 as an exemplary embodiment.

Additionally, even though the content manager system 116, records manager system 122, DRMS 128, and the email server software 134 are shown on separate servers, in an alternative embodiment, one or more of these system reside on the same server. Also, the records manager system 122, DRMS 128, and the email server software 134 can each reside within one another.

The user system1 102 and user system2 104 include, in one embodiment, protected electronic content 142, 146 and a DRMS client 144, 148. The protected electronic content 142, 146 is protected by the DRMS 128 and is transmitted to the user system 102, 104 through the network 114. The DRMS client 144, 148 allows the user systems 102, 104 to communicate with the DRMS 128 to authenticate an action to be performed on the protected electronic content 142. For example, if a user of user system1 102 wants to forward a protected email, the DRMS client 144 communicates with the DRMS 128 to verify that the user has permission to forward the email.

Exemplary Information Processing System

FIG. 2 is a block diagram illustrating a more detailed view of the server1 106 according to an embodiment of the present invention. Although the following discussion is with respect to server1 106, the discussion is also applicable to the user system1 104, user system2 106, server1 106, server2 108, server3 110, and the email server 112 as shown in FIG. 1. The server1 106 is based upon a suitably configured processing system adapted to implement the exemplary embodiment of the present invention. Any suitably configured processing system is similarly able to be used as server1 106 by embodiments of the present invention, for example, a personal computer, workstation, or the like. The server1 106 includes a computer 202. The computer 202 has a processor 204 that is connected to a main memory 206, mass storage interface 208, terminal interface 210, and network adapter hardware 212. A system bus 214 interconnects these system components. Mass storage interface 208 is used to connect mass storage devices, such as data storage device 216, to the server1 106. One specific type of data storage device is a computer readable medium such as a floppy disk drive, which may be used to store data to and read data from a floppy diskette 218 or CD (not shown). Another type of data storage device is a data storage device configured to support NTFS type file system operations.

The main memory 206 contains an application 220 such as content management software. The application 220, for example, is running or waiting to be executed. Although illustrated as concurrently resident in the main memory 206, it is clear that respective components of the main memory 206 are not required to be completely resident in the main memory 206 at all times or even at the same time. In one embodiment, the server1 106 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the server1 106.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 222 to computer 202 to provide a user interface to the server1 106. These terminals 222, which are able to be non-intelligent or fully programmable workstations, are used to allow system administrators and users to communicate with the server1 106. The terminal 222 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as the Linux, UNIX, Windows XP, and Windows Server 2003 of Microsoft Corporation of Redmond Wash. operating system. Embodiments of the present invention are able to use any other suitable operating system. Some embodiments of the present invention utilize architectures, such as an object oriented framework mechanism, that allows instructions of the components of operating system (not shown) to be executed on any processor located within the server1 106.

The network adapter hardware 212 is used to provide an interface to the network 114. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 218, CD ROM, or other form of recordable media, or via any type of electronic transmission mechanism.

Process of Initially Assigning Retention Policies and Usage Policies

Figure 3:
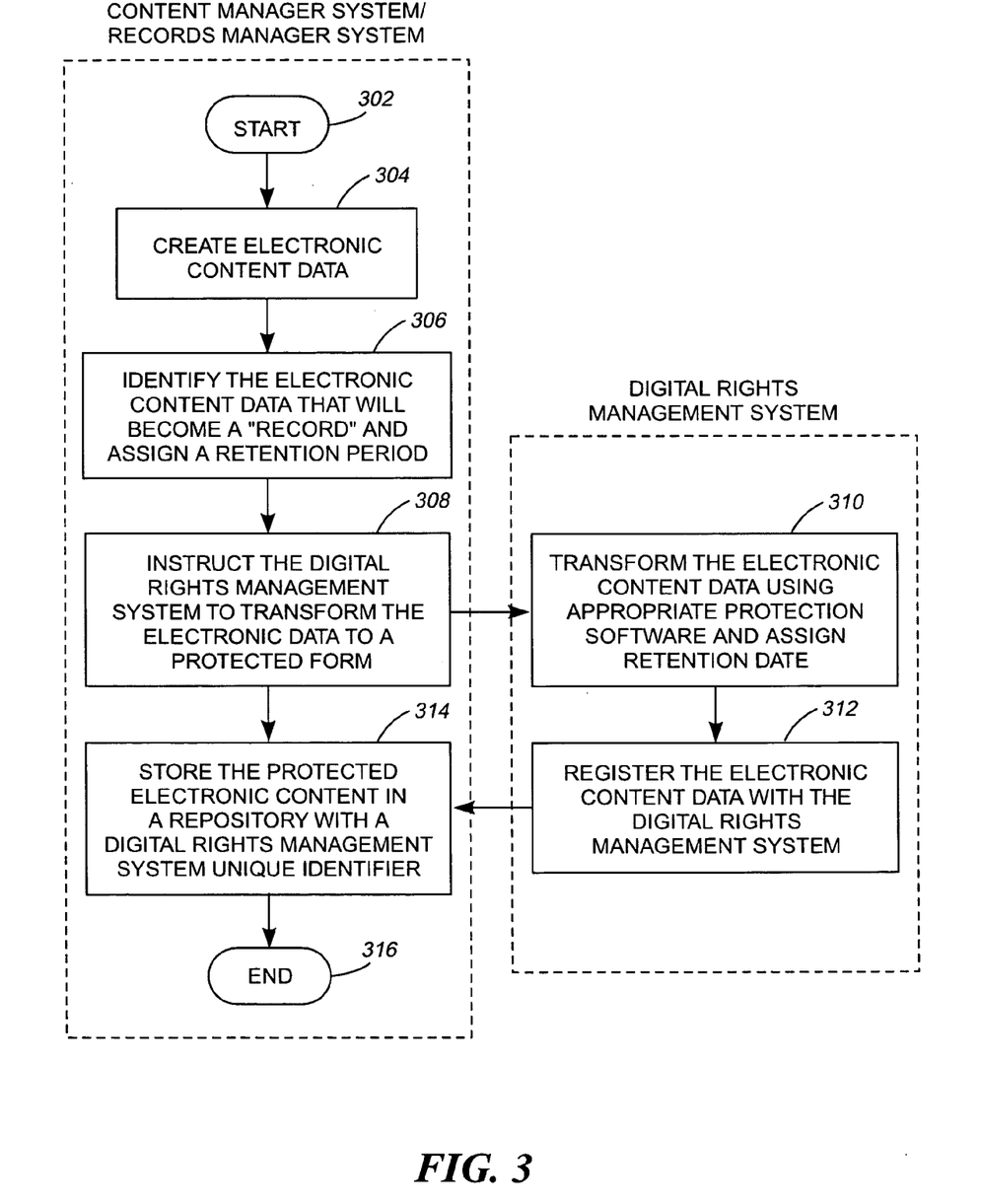
FIG. 3 is an operational flow diagram illustrating an exemplary process of initially assigning retention policies and usage policies for electronic content data according to an embodiment of the present invention.

FIG. 3 is an operational flow diagram showing an exemplary process of initially assigning retention policies and usage policies to electronic content data. The operational flow diagram of FIG. 3 begins at step 302 and flows directly to step 304. Electronic content data, at step 304, is created. For example, the electronic content author 138 creates an email and transmits it on the network via the email server 112. The email is managed by the content management system 116 and the records manager system 122, at step 306, identifies the email as electronic content that needs to be recorded. For example, if a business is managing electronic content through a content system 116 and has configured the records manager system 122 to retain all emails, the record manager identifies emails as content that needs to be recorded. The records manager also assigns a retention date to the recorded email. A retention date, for example, instructs the content manager system 116 how long to keep the particular content and what to do with it, e.g. delete it, when the retention date has expired.

The records manager system 122, at step 308, instructs the DRMS 128 to transform the electronic content data to a protected form. For example, the records manager system 122 sends the email data to the DRMS 128 along with instructions to encrypt and assign usage policies to the email. The DRMS 128, at step 310, transforms the electronic content data using appropriate protection software and assigns a retention date. For example, the DRMS 128 encrypts the email message and assigns usage policies such as who can view the email and what can be done with the email. The DRMS 128 also assigns a retention date to the email so that when the email is downloaded to a user system1 104, which is outside the control of content manager system 116 and records manager system 122, access can still be restricted to the email message.

In one embodiment, the electronic content author 138 can assign usage policies to electronic content. In this embodiment, a DRMS client (not shown) allows for usage policies to be set for electronic content through the DRMS 128. However, the protected electronic data is still managed by the content management system 116 and records manager system 122. Therefore, the records manager system 122 can still instruct the DRMS 128 to change the retention date accordingly. For example, an author 138 sets the email so that access is granted for an indefinite period of time. However, the records manager system 122 requires that access by restricted to the email after two years. Therefore, when the author 138 transmits that email message over the network 114, the records manager system 122 first instructs the DRMS 128 to assign a new usage policy to the email message with a retention period of two years. Now when the email message is downloaded onto the user system1 102, which is outside of the records manage system's 122 control, access is restricted to the email message on the user system1 102 after the retention date of two years has expired.

Continuing further, the electronic content data, at step 312, is registered with the DRMS 128. For example, the DRMS 128 stores usage policy and identifying information in the usage policy database 130. The electronic content data is registered with the DRMS 128 so that the DRMS 128 can identify the electronic content data and its associated usage policy when updates are received from the records manager system 122. The now protected electronic content data, at step 314, is stored in a repository, for example, the content database 118. In another, embodiment, the electronic content is stored in the repository before it is protected by the DRMS 128. In one embodiment, the protected electronic content data is stored with a DRMS 128 unique identifier in its metadata so that updates from the records manager system 122 for specific electronic content data can be communicated and identified to the DRMS 128. The retention date, as discussed above with respect to steps 304 and 310, can also be applied after the electronic data is stored in the repository. In other words, the retention date is not limited to being applied at specific point in time. The control flow, at step 316, then exits.

Process for Restricting Access to Electronic Content on a User System

Figure 4:
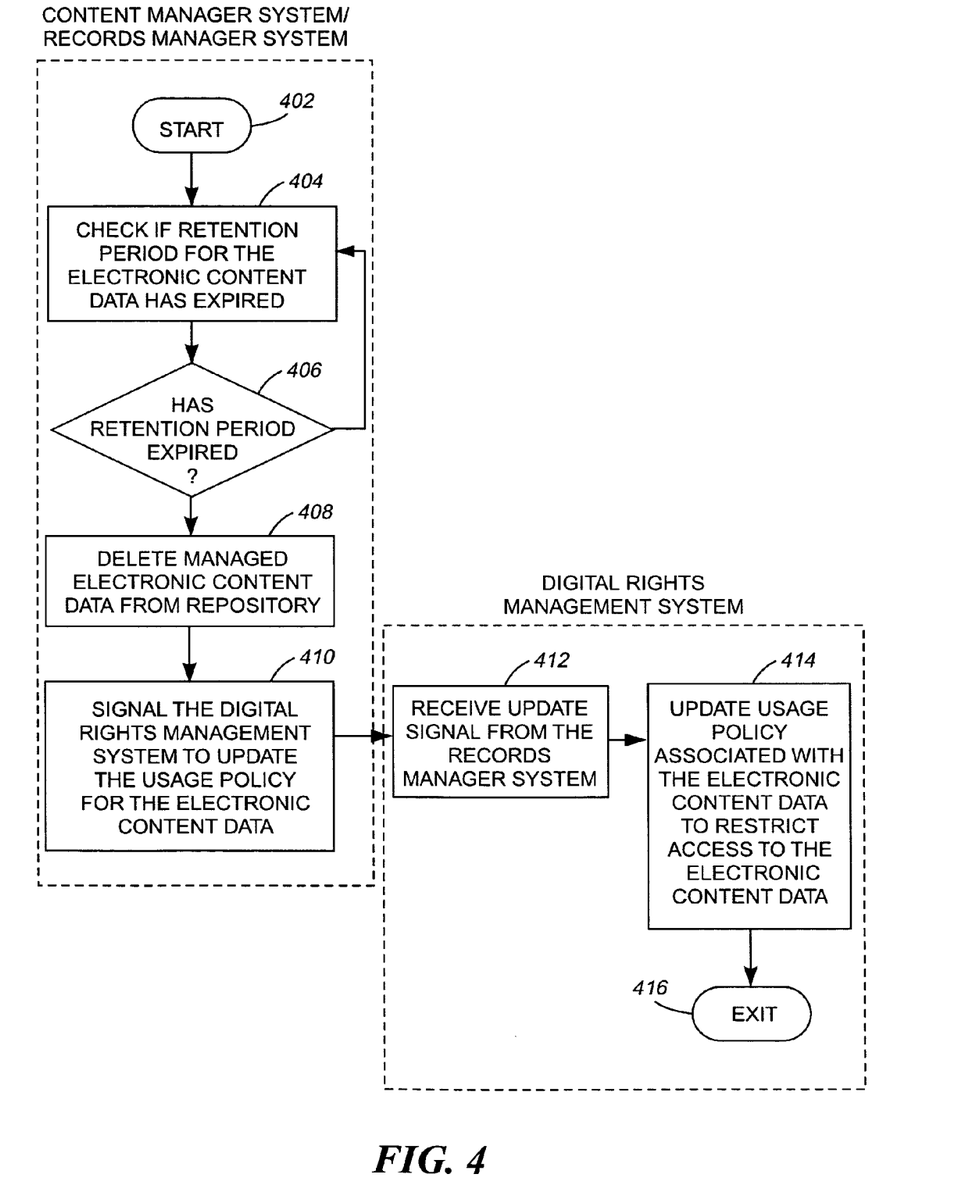
FIG. 4 is an operational flow diagram illustrating an exemplary process of restricting access to electronic content data residing outside of a content management system according to a retention policy set by a records manager system according to an embodiment of the present invention.

FIG. 4 is an operational flow diagram showing an exemplary process of restricting access to electronic content data residing outside of the content manager system 116 according to a retention policy set by the records manager system 122. The operational flow diagram of FIG. 4 begins at step 402 and flows directly to step 404. The records manager system 122, at step 404, checks the retention period for the electronic content data. The records manager system 122, at step 406, determines whether the retention period for the electronic data has expired. If the result of this determination is negative, the records manger system 122 continues to check the retention date of the electronic data at step 404. In another embodiment, the control flow exits. If the result of this determination is positive, the electronic content data stored in the repository, a step 408, is deleted and the record 126 stored in the records manager system 122 associated with the electronic data is updated to show the content has been deleted from the repository. In another embodiment, the record 126 is also deleted.

The records manager 122, at step 410, signals the DRMS 128 to update the usage policy for the electronic content data. For example, the records manager system 122 signals the DRMS 128 to restrict access to the electronic content data. In another embodiment, the electronic content is deleted before the retention period has expired. The deletion of the electronic data triggers the update signal to be sent to the DRMS 128 so that the usage policy for the content residing on the user system1 102 can be changed to restrict access. The DRMS 128, at step 412, receives the update signal from the records manager system 122 and updates, at step 414, the usage policy for the electronic data whose retention period has expired. The usage policy for the electronic content data now restricts access to the electronic data. The control flow, at step 416, then exits.

Figure 5:
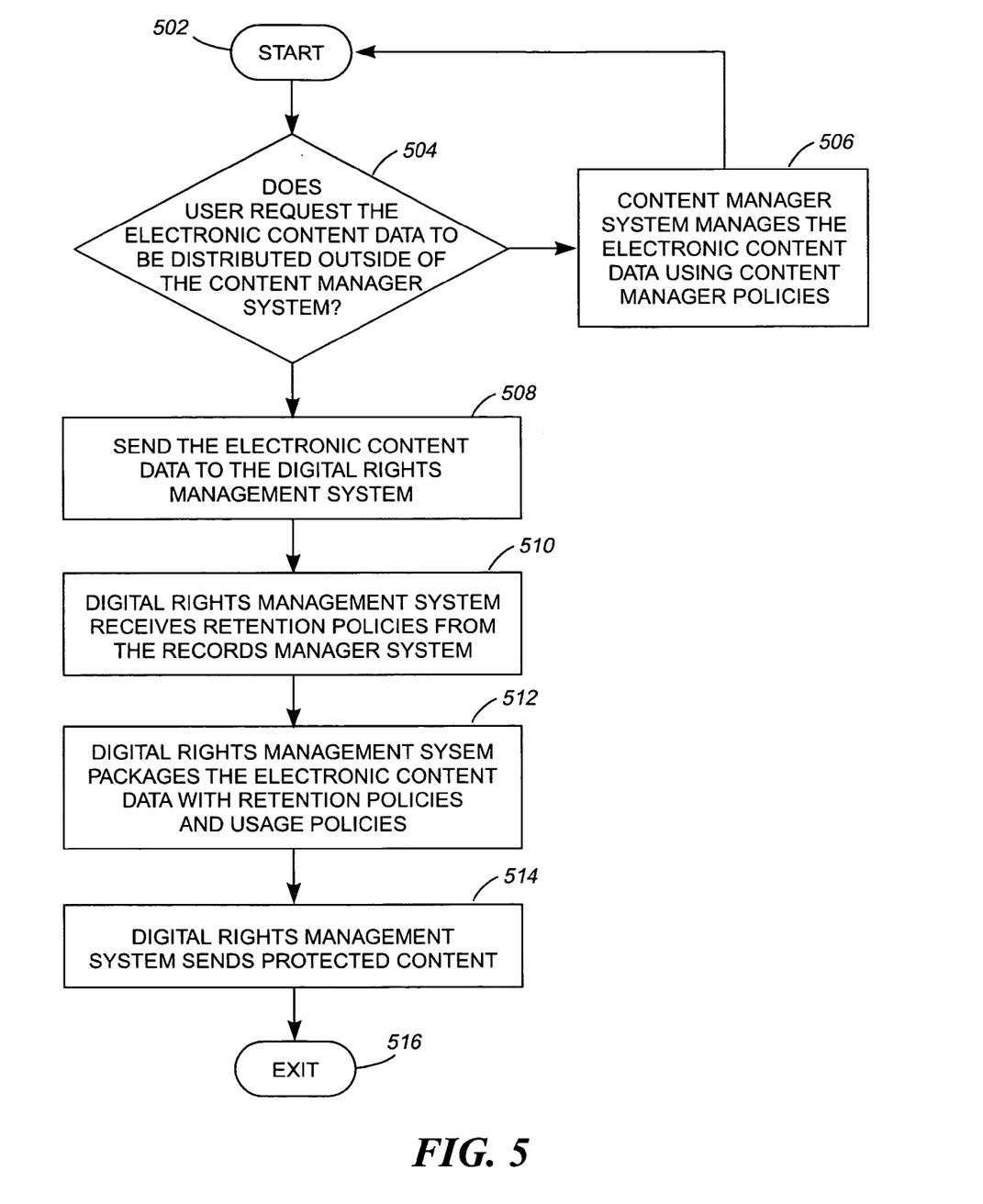
FIG. 5 is an operational flow diagram illustrating an exemplary process of extending a retention policy to electronic content data residing outside of a content management system according to an embodiment of the present invention.

Process for Extending a Retention Policy to Electronic Content Data Residing Outside of a Content Management System FIG. 5 is an operational flow diagram showing an exemplary process of extending a retention policy to electronic content data residing outside of the content management system 116. The operational flow diagram of FIG. 5 begins at step 502 and flows directly to step 504. The records manager system 122, at step 504, determines whether a user requests the electronic to be distributed outside of the content manager system 116. If the result of this determination is negative, the content manager system 116, at step 506, continues to manage the electronic data using content manager policies. If the result of this determination is positive, the electronic content data, at step 508, is transmitted to the DRMS 128. For example, if a user requests an email message to be distributed outside of a company intranet, the email message is first sent to the DRMS 128 to be protected. If the user is only sending the email message within the intranet, the content manager system 116 uses its own policies to manage the email message.

The DRMS 128, at step 510, receives retention policies transmitted from the record manager system 122. The DRMS 128, at step 512, packages the electronic content data with the retention policies and usage policies. For example, a packaged email message, in one embodiment, includes a retention policy setting the retention period for two years and also includes usage policies allowing the email message to only be viewed. The DRMS 128, at step 514, sends the protected electronic content to the destination. In another embodiment, when the user system1 102 receives the protected content 142, the DRMS client 144 monitors the content. For example, when the user tries to access a protected email message, the DRMS client 144 communicates with the DRMS 128 to verify that the user has authorization to access the email message. Therefore, if the usage policies are updated by the records manager system 122 while the email message is on the user system1 102, access can be restricted, for example, even though the email is not accessible by the records manager system 122.

Process for Dynamically Updating a Retention Policy

Figure 6:
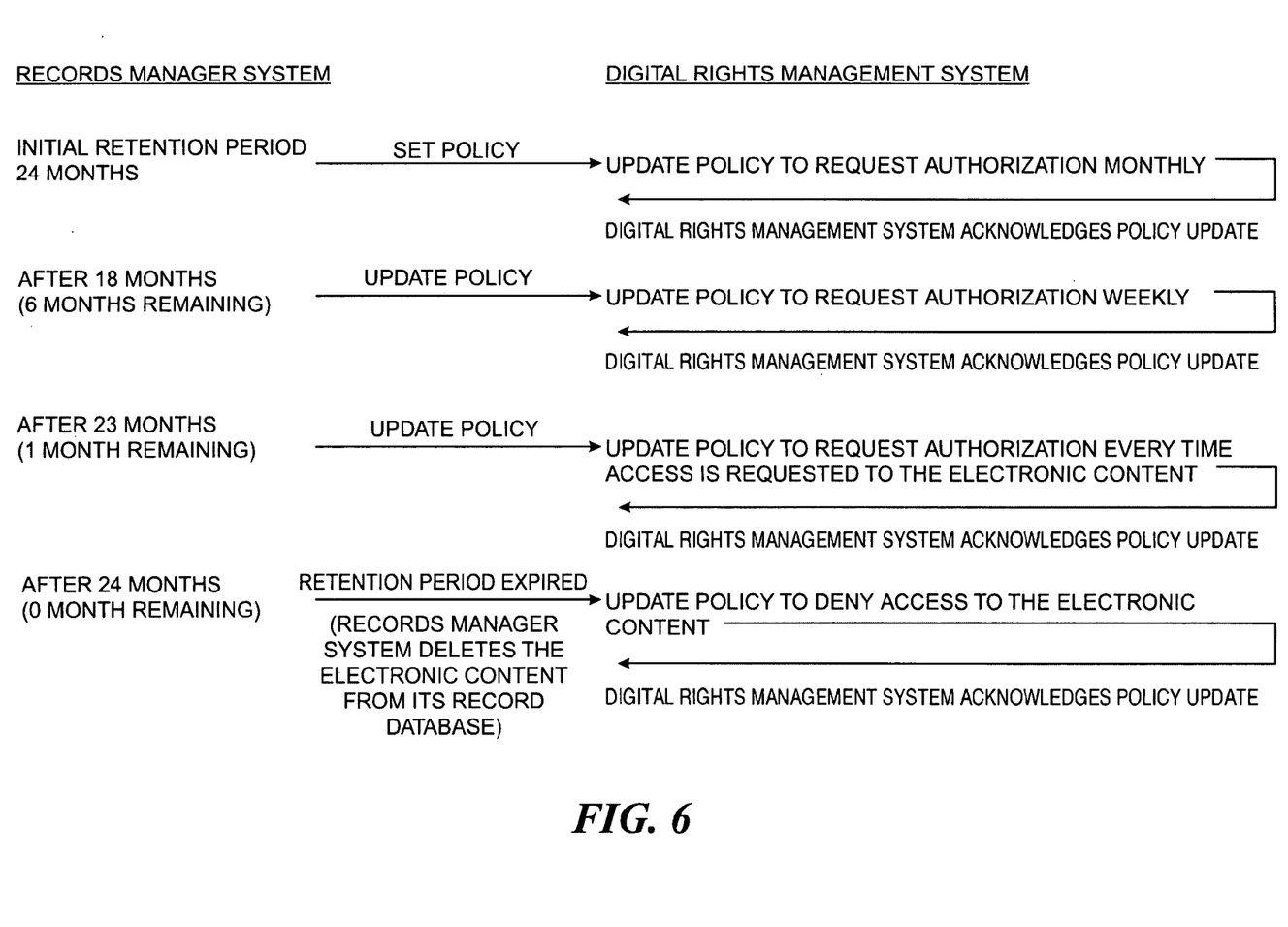
FIG. 6 is a communication flow diagram illustrating the process of dynamically updating a retention policy for electronic content data outside of a content manager system according to an embodiment of the present invention.

FIG. 6 is a communication flow diagram showing the communication flow between the records manager system 122 and the DRMS 128 during the process of dynamically updating the retention policy for electronic content data. After electronic content data is created and is determined to be data that needs to be retained for a period of time, the records manager system 122 initially sets a retention period for the electronic content data, as described with respect to FIG. 3. As described above with respect to FIG. 5, when the electronic content data is distributed onto a user system1 102 and a user tries to access the electronic content data, the DRMS client 144 communicates with the DRMS 128 to authorize access. However, in one embodiment, a lease period is set for the electronic content data so that the DRMS client 144 only communicates with the DRMS 128 after the lease period expires.

The records manager system 122, in one embodiment, instructs the DRMS 128 to set an initial usage policy. For example, if the initial retention period for electronic content data was set at twenty-four months, the records manager system 122 instructs the DRMS 128 to have the DRMS client 144 request authorization on a monthly basis instead of every time access is requested. In one embodiment, the DRMS 128 sends an acknowledgement to the records manger system 122 whenever usage policy updates are made by the DRMS 128 according to the instructions received from the records manager system 122. During the initial retention period, the records manager system 122, for example, needs to change the retention policy of the electronic content data, which is now on a user system1 102 and outside the direct control of the content manager system 116 and the records manager system 122. For example, after six months have passed during the twenty-four month retention period, the records manager sends an update signal to the DRMS 128 instructing the DRMS 128 to update the retention policy. The retention policy is updated so that the DRMS client 144 communicates with the DRMS 128 on a weekly basis to request authorization.

As the end of the retention period nears, the records manager, for example, with one month remaining, once again requires the retention policy to be updated. An update signal is sent to the DRMS 128 instructing the DRMS 128 to update the retention policy so that the DRMS client 144 communicates with the DRMS 128 every time access is requested to the electronic data. When the retention period expires, the records manager system 122 deletes the electronic data record 126 associated with the electronic content data. In another embodiment, if a copy of the electronic data exists in the content database, this copy is also deleted. The DRMS 128 is instructed by the records manager system 122 to update the usage policy of the electronic content data so that access to the content is restricted.

In another embodiment, the policy itself dictates that the DRMS client 144, 148 needs to periodically contact the DRMS system 128 to determine if a retention policy update has been issued. Therefore, in addition to contacting the DRMS system 128 for authorization, the DRMS client 144, 148 also contacts the DRMS system 128 at predefined intervals of time to request retention policy update information.

One advantage of the present invention is that access to electronic content data that has been distributed outside the control of a content manager system and records manager system is able to be restricted according to the retention policies of the record manager system. When content is distributed outside the control of these systems, retention policies are not extendable to the distributed content. A DRMS is used to control the usage of the distributed content. However, the present invention allows the records manager system to extend its retention policies through the DRMS to content that has been distributed to a local computer.

Non-Limiting Examples

The foregoing embodiments of the present invention are advantageous because they provide user processes and represent system capabilities in a software package format allowing, among other things, information about versions of dependencies such as libraries that were used, run-time command options, and the like to be provided in a software package database. Also, describing system capabilities/resources in a software package format allows a software package to be extendable if a new capability is added and allows for a more complete specification of the hardware and software that the software was designed to run on. Additionally, the present invention allows for much finer-grained dependencies in the dependency resolution stage as opposed to runtime checks for capabilities during the install step.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for managing a retention period for electronic content data, the method on a server comprising:

receiving, at a records manager system on a first information processing system, a set of electronic content data from a content provider, wherein the content provider has assigned a first set of usage policies to the set of electronic content data;

determining, by the records manager system, a second usage policy based on a retention period defined for the set of electronic content data by the records manager system;

instructing, by the records manager system, a digital rights manager system on a second information processing system to protect each of the plurality of electronic content data in the set of electronic content data with the second set of usage policies by replacing the first set of usage policies with the second set of usage policies, wherein the second set of usage policies includes usage information and a retention period, which is governed by the records manager system;

storing, by the records manager system, a copy of the set of electronic content data that is to be protected by the digital rights manager system in a content manager system according to the retention period defined for the set of electronic content data;

determining, by the records manager system that the retention period defined for the set of electronic content data has expired;

deleting, by the records manager system, the set of electronic content from the content manager system in response to the retention period defined for the set of electronic content data having expired; and instructing, by the records manager system, the digital rights manager system, to update the second set of usage policies in response to the set of electronic content being deleted from the content manager system so that access to the set of electronic content data is denied.

2. The method of claim 1, further comprising:
logging, for later auditing, the retention period defined for the set of the electronic content data.

3. The method of claim 1, wherein the digital rights manager system queries the records manager system to receive one of:
an initial retention policy; and
an updated retention policy.

4. The method of claim 1, wherein an author creating the plurality of electronic content data is separate and distinct from an administrator setting the retention period defined for the set of electronic data in the records management system.

5. The method of claim 4, wherein the retention period for the set of electronic data is governed by one of:
corporate policy;
state law; and
federal law.

6. The method of claim 1, further comprising:
determining, by the records manager system, if the retention period has expired for at least one of the plurality of electronic content data; and
instructing, by the records management system, the digital rights management system to update the at least one usage policy for at least one of the electronic content data in the plurality of electronic content data to restrict access to the at least one of the electronic content data in response to the retention period defined for the at least one of the electronic content data expiring.

7. The method of claim 1, further comprising:
logging, by the records manager system, that access, by a user of the content manager system, has been restricted to each of the electronic content data having a retention period that has expired.

8. The method of claim 1, further comprising:
instructing, by the records management system, the digital rights management system to update the usage policy for at least one of the plurality of electronic content data at least once after an interval of time has passed within the retention period for the at least one of the plurality of electronic content data.

9. A system for managing a retention period for electronic content data, the system comprising:
a first information processing system comprising:
a digital rights manager adapted to associate usage polices with a plurality of electronic content data; and
at least a second information processing system communicatively coupled to the first information processing system comprising:
a content manager adapted to manage a plurality of electronic content data; and
a records manager communicatively coupled to the content manager and the digital rights management system, wherein the content manager system, the digital rights management system, and the records manager system are distinct and separate from each other, and where the records manager adapted to:
receive, at the records manager a set of electronic content data from a content provider, wherein the content provider has assigned a first set of usage policies to the set of electronic content data;
determine, by the records manager, a second usage policy based on a retention period defined for the set of electronic content data by the records manager;
instruct, by the records manager, the digital rights manager to protect each of the plurality of electronic content data in the set of electronic content data with the second set of usage policies by replacing the first set of usage policies with the second set of usage policies, wherein the second set of usage policies includes usage information and a retention period, which is governed by the records manager;
store, by the records manager, a copy of the set of electronic content data that is to be protected by the digital rights manager in the content manager according to the retention period defined for the set of electronic content data;
determine, by the records manager that the retention period defined for the set of electronic content data has expired;
delete, by the records manager, the set of electronic content from the content manager in response to the retention period defined for the set of electronic content data having expired; and
instruct, by the records manager, the digital rights manager, to update the second set of usage policies in response to the set of electronic content being deleted from the content manager so that access to the set of electronic content data is denied.

10. The system of claim 9, wherein the records manager further comprises a means for logging, for later auditing, the retention period defined for the set of the electronic content data.

11. The system of claim 9, wherein the digital rights manager queries the records manager to receive one of:
an initial retention policy; and
an updated retention policy.

12. The system of claim 9, wherein the retention period defined for the set of the electronic content data is governed by one of:
corporate policy;
state law; and
federal law.

13. The system of claim 9, wherein the records manager is further for determining if the retention period has expired for at least one of the plurality of electronic content data, and wherein the records manager instructs the digital rights manager to update the at least one usage policy for at least one of the electronic content data in the plurality of electronic content data to restrict access to the at least one of the electronic content data in response to the retention period defined for the at least one of the electronic content data expiring.

14. The system of claim 9, wherein the records manager further instructs, the digital rights manager to update the usage policy for at least one of the plurality of electronic content data at least once after an interval of time has passed within the retention period for the at least one of the plurality of electronic content data.

15. A computer program product for managing a retention period for electronic content data, the computer program product on a server comprising:
a computer readable storage medium readable by the server, the computer readable storage medium instructions for performing:
receiving, at a records manager system on a first information processing system, a set of electronic content data from a content provider, wherein the content provider has assigned a first set of usage policies to the set of electronic content data;
determining, by the records manager system, a second usage policy based on a retention period defined for the set of electronic content data by the records manager system;
instructing, by the records manager system, a digital rights manager system on a second information processing system to protect each of the plurality of electronic content data in the set of electronic content data with the second set of usage policies by replacing the first set of usage policies with the second set of usage policies, wherein the second set of usage policies includes usage information and a retention period, which is governed by the records manager system;
storing, by the records manager system, a copy of the set of electronic content data that is to be protected by the digital rights manager system in a content manager system according to the retention period defined for the set of electronic content data;
determining, by the records manager system that the retention period defined for the set of electronic content data has expired;

deleting, by the records manager system, the set of electronic content from the content manager system in response to the retention period defined for the set of electronic content data having expired; and instructing, by the records manager system, the digital rights manager system, to update the second set of usage policies in response to the set of electronic content being deleted from the content manager system so that access to the set of electronic content data is denied.

16. The computer program product of claim 15, further comprising instructions for:

determining, by the records manager system, if the retention period has expired for at least one of the plurality of electronic content data; and instructing, by the records management system, the digital rights management system to update the at least one usage policy for at least one of the electronic content data in the plurality of electronic content data to restrict access to the at least one of the electronic content data in response to the retention period defined for the at least one of the electronic content data expiring.

17. The computer program product of claim 15, further comprising instructions for:

logging, by the records manager system, that access, by a user of the content manager system, has been restricted to each of the electronic content data having a retention period that has expired.

18. The computer program product of claim 15, further comprising instructions for:

instructing, by the records management system, the digital rights management system to update the usage policy for at least one of the plurality of electronic content data at least once after an interval of time has passed within the retention period for the at least one of the plurality of electronic content data.

* * * * *